Oct. 18, 1932.                H. T. AVERY                1,882,730
                        AUTOMATIC STEERING DEVICE
                    Filed June 22, 1927      7 Sheets-Sheet 1
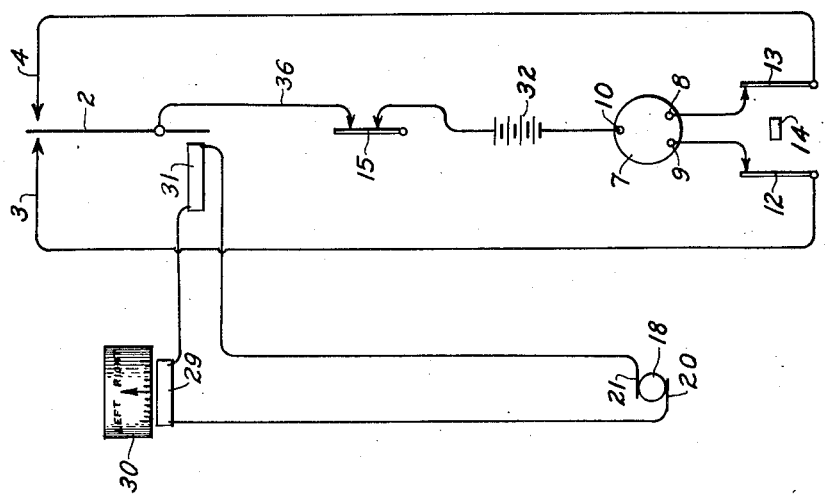
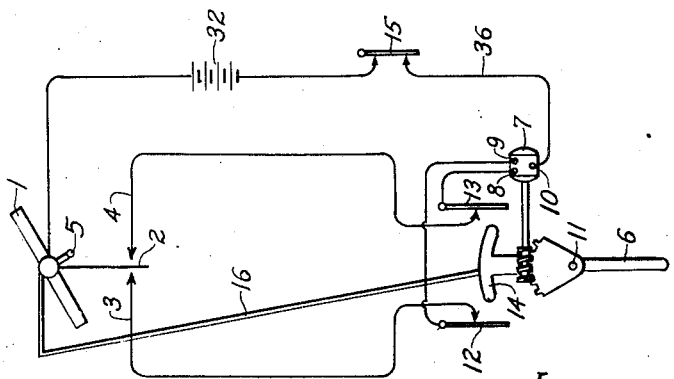
Inventor:
Harold T. Avery

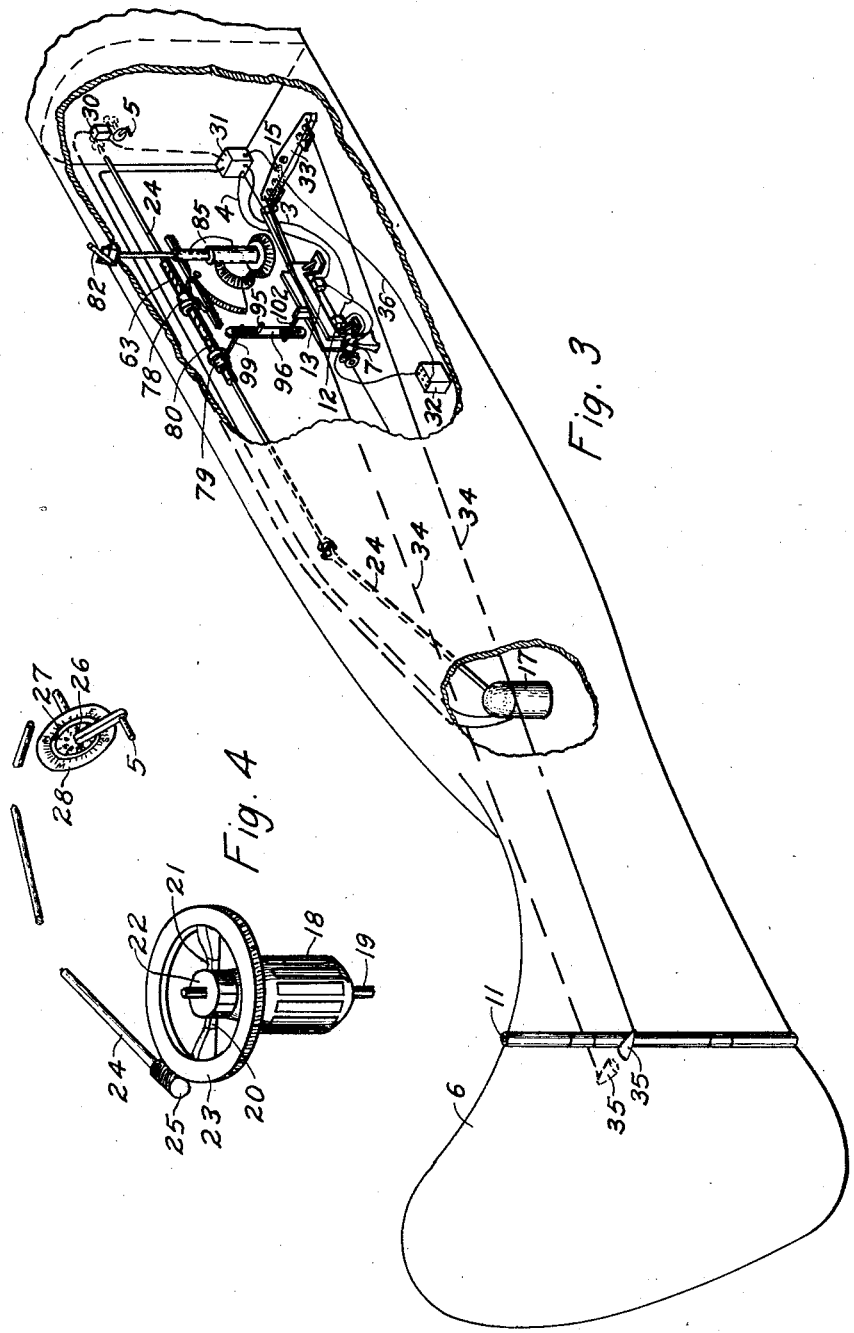

Oct. 18, 1932.  H. T. AVERY  1,882,730
AUTOMATIC STEERING DEVICE
Filed June 22, 1927  7 Sheets-Sheet 4

Inventor:
Harold T. Avery

Oct. 18, 1932.                 H. T. AVERY                   1,882,730
                         AUTOMATIC STEERING DEVICE
                         Filed June 22, 1927        7 Sheets-Sheet 5
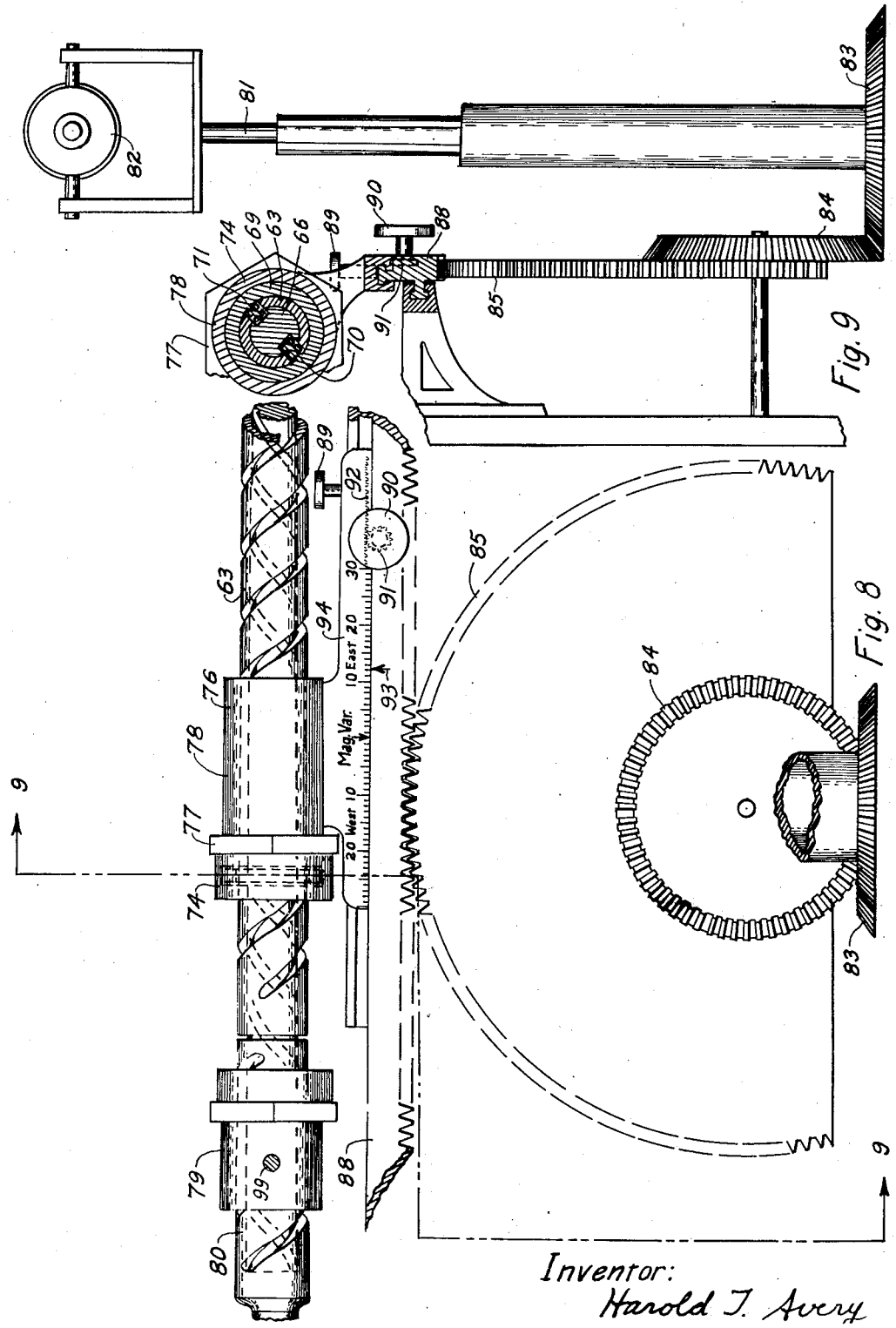

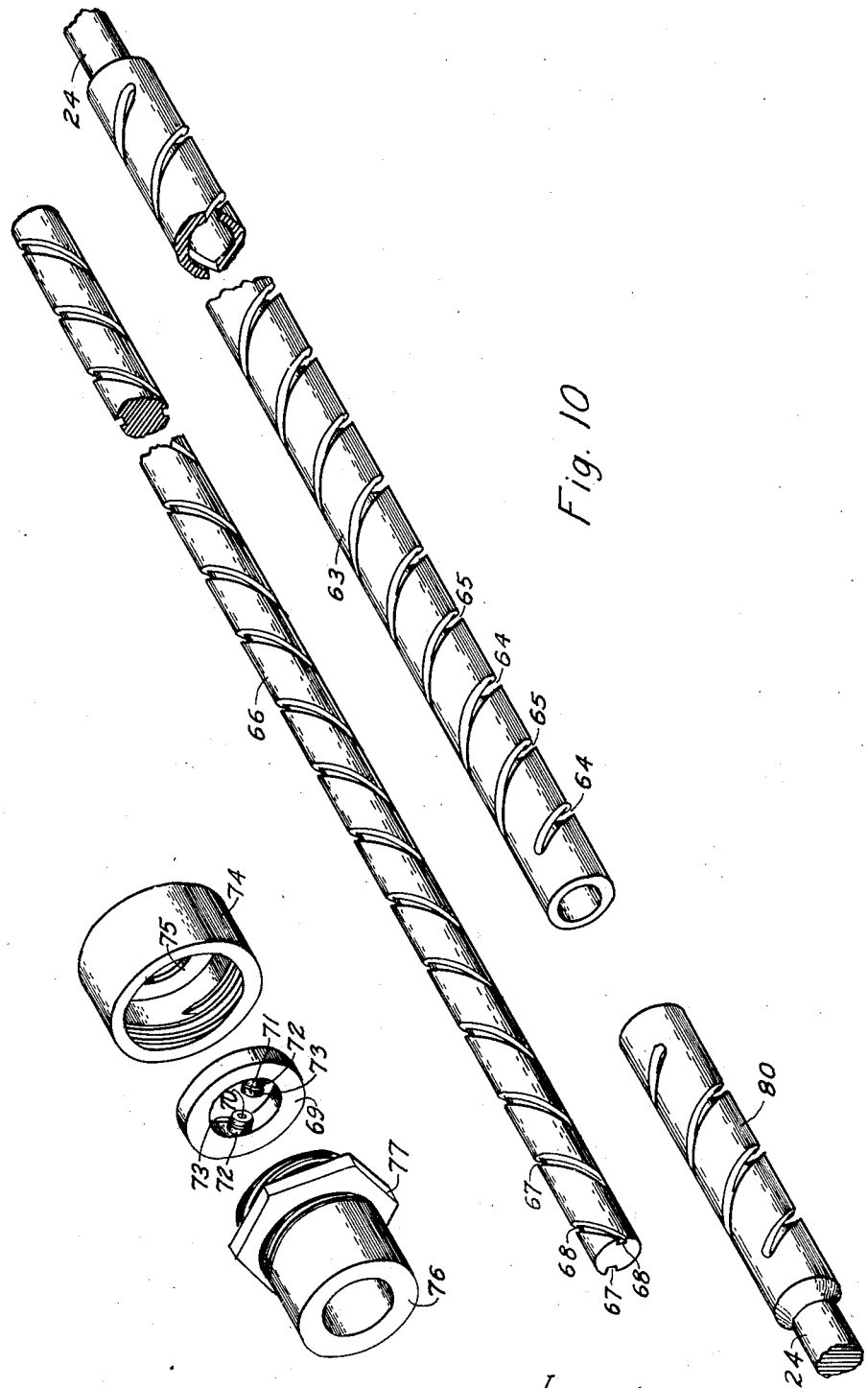

Oct. 18, 1932.  H. T. AVERY  1,882,730
AUTOMATIC STEERING DEVICE
Filed June 22, 1927  7 Sheets-Sheet 7

Inventor:
Harold T. Avery

Patented Oct. 18, 1932

1,882,730

UNITED STATES PATENT OFFICE

HAROLD T. AVERY, OF SAN LUIS OBISPO, CALIFORNIA

AUTOMATIC STEERING DEVICE

Application filed June 22, 1927. Serial No. 200,630.

This invention relates to a device capable of automatically steering any dirigible vehicle. The device is particularly applicable to the steering of airplanes and other aircraft.

The objects of this invention are:

1. The provision in a dirigible vehicle of means for automatically steering the vehicle on any course.

2. The insuring of maximum dependability and service by designing said means with the minimum of electrical contacts and delicately adjusted parts.

3. The provision in an automatic steering device of means for bringing a dirigible vehicle back onto the desired course when deflected therefrom without tending to throw it across said course.

4. The provision in such a device of means for keeping the turning force exerted by the steering means approximately proportional to the amount the vehicle is off the desired course, thus insuring maximum smoothness of steering.

5. The provision in such a device of means for adjusting the ratio pertaining between the turning force exerted by the steering means, and the angular deflection of the vehicle from its course.

6. In such a device arrangement for changing from automatic steering to direct steering by the pilot or vice versa with the utmost ease.

7. Provision of means for making the automatic steering automatically operative upon cessation of direct steering by the pilot.

8. In such a device arrangement for limiting the range of the rudder or other steering element during automatic steering and for adjusting the limits of such range.

9. In such a device the provision of means operative upon the commencement of direct steering by the pilot, for automatically rendering inoperative the automatic steering device, the limitation of rudder range effective during automatic steering, and the influence of the rudder position on the course indicated.

10. In such a device provision for automatically leaving all battery circuits open when the vehicle is not operating.

11. The provision of an automatic steering device capable of being conveniently set to steer a vehicle either on a course mathematically known or determined from a map or on a course visibly selected on the ground.

12. The provision in such a device, when controlled by directional means dependent on the earth's magnetic field, of means for correcting for the magnetic variation.

13. The provision of an automatic steering device particularly adapted for use in aircraft.

14. The provision in aircraft of means for correcting for drift, by direct observation without subsequent computation or settings of corrections.

Other objects and advantages will hereinafter appear.

In addition to the above novel results, several constructional features of the invention will be apparent from the following specifications and claims. The invention consists in the novel general and specific combination of parts as hereinafter set forth.

The general relation of parts in the invention and a preferred embodiment of the invention as applied to aircraft, with particular reference to airplanes, is described in the following specification and illustrated in the accompanying drawings. The broad scope of the invention is particularly set forth in the appended claims.

In the drawings:

Fig. 1 is a diagrammatic representation of the electrical circuits and other essential parts, showing their relative relations.

Fig. 2 is a diagrammatic representation of the electrical circuits in the particular embodiment that utilizes an earth inductor compass as the directional element.

Fig. 3 is a perspective view showing some of the principal parts of a particular embodiment of this invention as installed in an airplane.

Fig. 4 is a perspective view of certain of the essential parts of the earth inductor compass.

Fig. 8 is a right side elevation of certain of the mechanism shown in Fig. 5 including particularly that connected with the "drift" and "magnetic variation" corrections.

Fig. 9 is a vertical section along line 9—9 of Fig. 8, showing also the sighting device.

Fig. 10 is a perspective view showing, disassembled, a part of the mechanism used for introducing the "drift", "magnetic variation", and "rudder-position" corrections into the course setting.

A. GENERAL FORM OF INVENTION

1. *Directional element*

Figure 5:
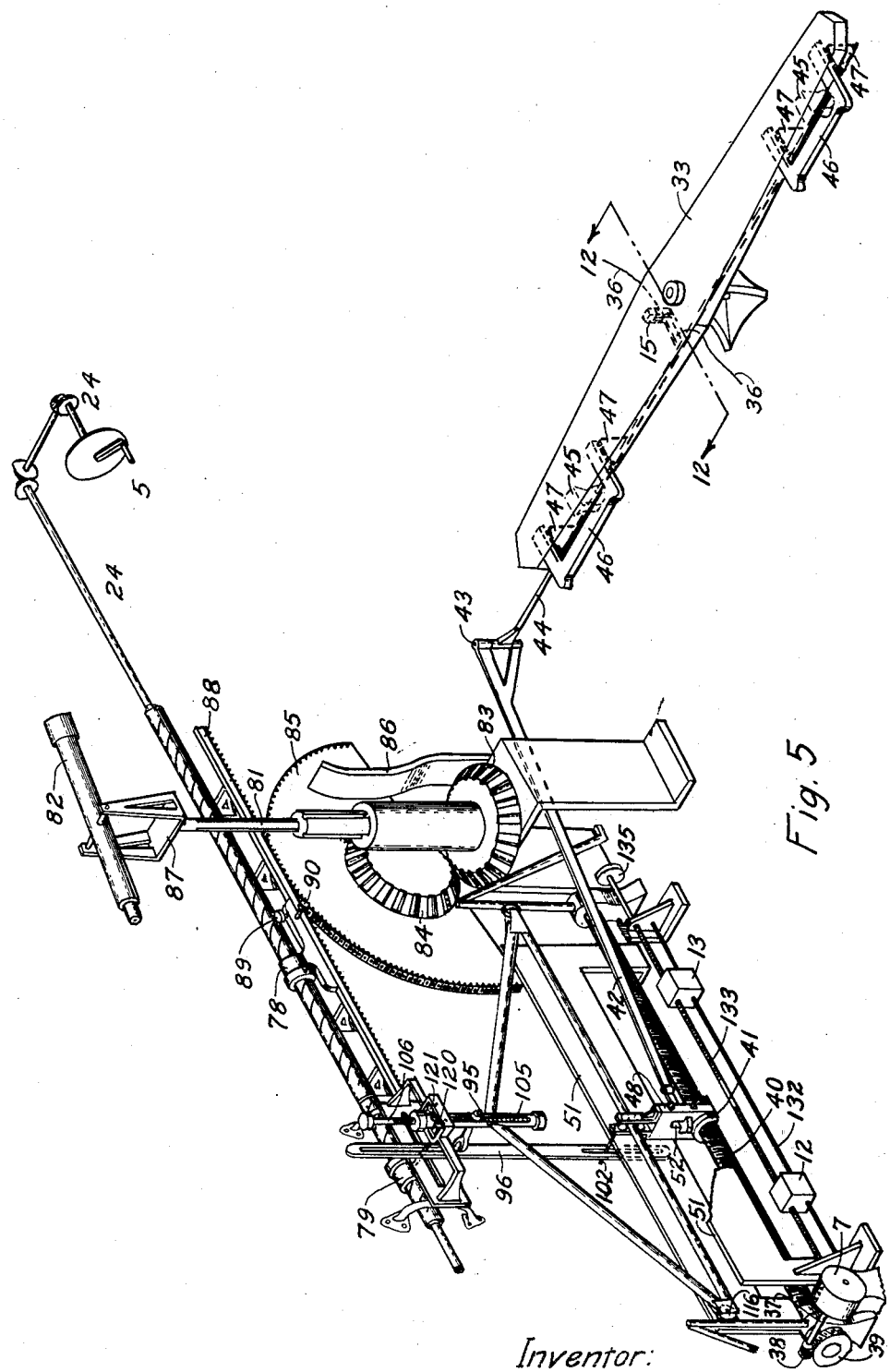
Fig. 5 is an enlarged perspective view of certain of the mechanical parts shown in Fig. 3 and of other parts connected therewith.

The essential features of this invention in its general form are shown diagrammatically in Fig. 1, in which the numeral 1 represents a directional element such as a magnetic compass, gyro compass, earth inductor compass or the like, capable of indicating substantially a constant course throughout the movements of the vehicle on which it is mounted. Numeral 2 represents an electrical contact arm actuated by directional element 1. When arm 2 is moved to the left or right of the position indicated it will close circuit 3 or circuit 4, respectively. Course-setting device 5 is capable of adjusting the angular relation between directional element 1 and contact arm 2, so that arm 2 will be in the neutral position indicated when the vehicle is on the desired course.

2. *Steering element*

Numeral 6 represents the steering element, the rotational displacement of which directly acts to change the course of the vehicle. In the case of a ship, airship, or airplane, this is ordinarily a rudder. Numeral 7 represents an electric motor, or other source of power electrically controlled, capable of producing rotational displacement of the rudder or other steering element. In case a single electric motor is utilized as this source of power it may be so wired electrically, as for instance by double wiring of the field or the armature, that current flowing from binding post 8 to binding post 10 will produce rotation in one direction, while current from post 9 to post 10 will produce rotation in the opposite direction. The source of power 7 is connected to the steering element 6 in such a manner that this rotation produces angular displacement of the steering element. In the particular arrangement shown in Fig. 1 the rotation caused by current entering at post 8 causes clockwise rotation of element 6 on its axis 11, while the rotation caused by current entering at 9 produces the reverse rotation of element 6.

3. *Cut-out and control switches*

Numerals 12 and 13 represent cut-out switches operated by bumper 14, which moves in unison with steering element 6 in such a manner that circuit 3 is broken at switch 12 when element 6 assumes the extreme counterclockwise position that it is desired to allow it during automatic steering, and circuit 4 broken at switch 13 when element 6 assumes the extreme clockwise position. The available range of the steering element is thus effectively limited during automatic steering by these cut-out switches.

Numeral 15 represents a control switch by the opening of which the operation of automatic steering can be stopped. The closing of switch 15 throws the automatic steering device into operation. For practical operation of the device it is essential that the arrangement be such that there will be no danger of a battery circuit remaining closed while the vehicle is idle, thus discharging the battery. If, when the vehicle stops either circuit 3 or 4 is closed the steering element will be swung over until cut-out switch 12 or 13 opens. The vehicle being stationary and not amenable to the steering element no new contact will be made until the vehicle again moves. Thus the cut-out switches serve not only to limit the range of the steering element but also as automatic cut-outs for the battery circuit when the vehicle is idle.

4. *Rudder-position correction mechanism*

Numeral 16 represents a mechanism which I choose to term a "rudder-position correction device", connecting the rudder or other steering element 6 with the course-setting device 5 in such a manner as to introduce whenever the steering element is displaced from its neutral position, a course correction (that is to vary the angular relation existing between directional element 1 and contact arm 2) in a direction and amount corresponding and proportional to the displacement of the steering element. The reason for introducing this correction is as follows:—

If a steering device such as above described were to be operated without the rudder-position correction device, a displacement of the vehicle to the right of the course on which it is being steered would cause a relative rotation of directional element 1 to the left, closing circuit 4 and starting motor 7 rotating in such a manner as to displace steering element 6 in a direction such as to swing the vehicle back toward course again. Since circuit 4 would be closed until the vehicle were back on course, the rudder, or other steering element utilized, would continue to be displaced further and further from its neutral position until the vehicle were on course, unless cut-out switch 13 served to sooner limit its movement, and it would not tend to return to its neutral position until the vehicle were to the left of its course and circuit 3 closed. While the rudder was returning to its neutral position the vehicle would be to the left of its course and the rudder tending to turn it still further to the left, so that by the time the rudder reached its neutral position it would have to swing across neutral and turn the vehicle to the right. The net tendency of such an arrangement would be to keep the vehicle swinging across course instead of to steady it onto the desired course, a slight deflection from course tending to start the vehicle to swinging through an increasing range. The rudder-position correction device overcomes these difficulties and tends to steady the vehicle onto the desired course, as follows:—

Whenever steering element 6 swings from neutral in such a direction as to produce a turn toward the left, mechanism 16 alters the effective course setting to one to the right of the desired course, the amount of such correction, as previously mentioned, being proportional to the swing of the steering element. Therefore, instead of circuit 4 remaining closed until the vehicle returns to course, we have the vehicle starting to swing to the left, and the course-setting to the right, so that the course of the vehicle and the effective course set will coincide at some course to the right of the desired course, contact arm 2 returning to its neutral position when such coincidence is reached. The electrical circuits are thereupon the same as though the vehicle were on its true course and were it possible for the vehicle to continue its movement without changing course it would remain in a state of equilibrium and move along this new course instead of the desired one, but since the course can only be thus corrected from the desired course while the steering element is set for a left turn the vehicle will swing to the left of this new course and close circuit 3 thus starting the steering element returning to its neutral position. As it returns mechanism 16 acts to proportionately reduce the course correction. When the corrected course, which is moving to the left as the steering element returns becomes that on which the vehicle is temporarily headed circuit 3 will open, and as the vehicle swings to the left of such course it will be closed again. Thus, as the vehicle returns to course the steering element straightens out until when it finally reaches course the steering element is straight and the vehicle steadied onto course. When the vehicle is displaced to the left of its course the action is the same as described above except that the direction of all displacements and corrections are reversed and the functioning of circuits 3 and 4 interchanged.

It will be noted that the vehicle cannot continue upon any course other than the desired course, for no correction from the desired course is introduced except when the steering element is set so as to turn the vehicle from the revised course toward the desired course. It will also be noted that for each steering element position there is a definite course correction, proportional to the displacement of the element from neutral, and vice versa for each amount the vehicle may be off course there is a certain definite position the steering element will tend to assume operating to return the vehicle to course, the set being such that the tendency to return increases approximately in proportion to the amount the vehicle is off course. With the tendency to turn thus gradually diminishing to zero as the vehicle comes onto course there is no tendency to throw across course, but the vehicle is smoothly steadied onto course.

It will be apparent to those skilled in the art that my "rudder-position correction mechanism" accomplishes substantially the same results attained in most former automatic steering devices by means of the "follow-up mechanism", but that the fundamental relation and action of parts is quite different in the two mechanisms. In common with other usual forms of automatic steering devices, the course to be steered is fixed in my device by the angular relation pertaining between the directional element and the course-defining member, which in the case of my device is contact arm 2. My rudder-position correction mechanism functions by providing means by which the rudder, when moved, alters this angular relation by an amount proportional to the rudder movement. The ordinary follow-up mechanism does not alter this angular relation but utilizes the directional element to measure the departure of the vehicle from the course of which the steering mechanism is set, and mechanically equates the rudder displacement to a movement proportional to such departure.

The reason for the difference between my rudder-position correction mechanism and the ordinary follow-up mechanism will be particularly apparent in connection with the preferred embodiment which I describe hereafter, and which utilizes an earth inductor compass as its directional element. While this type of compass is adapted to automatically indicate the direction of the craft's departure from a given course, it is not adapted, as are certain other types of directional elements, to automatically set off the amount of such departure in a way that may be followed up by the rudder. It is therefore not practicable to use the ordinary type of follow-up mechanism with this type of compass, but my rudder-position correction mechanism is ideally adapted to such use.

It will be observed that this mechanism provides an alternative for the ordinary follow-up mechanism adaptable to use with any of the types of directional elements with which such mechanisms are used, and that, for the reasons above noted, it is adapted for use with the earth inductor compass, where the follow-up type of mechanism would not prove practicable.

B. PREFERRED EMBODIMENT FOR USE IN AIRCRAFT

1. *Earth inductor compass*

Although any of the types of directional elements mentioned under Secton A 1, of these specifications, may be utilized in aircraft, the earth inductor compass has certain well recognized advantages for such use and I have therefore indicated same as the directional element of my preferred embodiment. It will be readily understood however, that one of the other types of directional elements could be substituted without essentially altering the remaining mechanism.

The earth inductor compass consists of an electric generator having an armature revolving on an approximately vertical axis, but having no electrical field. The armature revolving in the earth's magnetic field generates current. The amount of current transmitted from the generator through the brushes which contact with the commutator of the generator armature depends on the angle between the brushes and the earth's magnetic field, there being two diametrically opposite positions of the brushes at which no current will be transmitted. If the brushes are made adjustable so that they can be set at any desired angle with the axis of the ship or other vehicle on which the compass is mounted there will be for each position of the brushes two diametrically opposite headings of the ship on which no current will flow from the generator. A deviation to one side or the other of such a course will produce current in one direction or the other. A galvonometer registering such current will indicate whether the ship is on the desired course or to the right or the left of such course. By designating the indication of one direction of current as "right" and the other as "left" one of the "no current" headings can be distinguished as forward and the other as reverse, for the reason that when the ship is on reverse heading a turn to the right will give a "left" indication and vice versa.

Fig. 3 illustrates an earth inductor compass installed on an airplane and Fig. 4 shows greater detail of certain of the parts. Within generator unit 17 armature 18 is rotated on the approximately vertical axis 19 by an electric motor, air impeller, or other suitable source of power. Brushes 20 and 21 contact with commutator 22, and are attached to worm gear 23 in such a manner that the angle between the axis of the brushes and the longitudinal axis of the airplane is fixed by the position of the worm gear. The position of this worm gear can, in turn, be adjusted by the rotation of shaft 24 on the end of which is worm 25 meshing with worm gear 23. Shaft 24 can be rotated by controller handle 5 on the instrument board, the motion being transmitted through proper bevel gears and universal joints. A convenient arrangement is to have each revolution of handle 5 and worm 25 rotate worm gear 23 through 10 degrees. Handle 5 can then carry a disc 26 (Fig. 4) graduated in 10 parts each representing 1 degree, as read against a fixed lubber line 27. Another disc 28 graduated in 36 equal parts, marked with the points of the compass and numbers to represent azimuth angles, may be connected to disc 26 by such a train of gearing that each revolution of disc 26 produces 1/36 revolution of disc 28. Thus disc 28 makes one complete revolution for each revolution of worm gear 23 and the brushes, and can be graduated so as to indicate for each setting of the brushes the course on which the craft must be heading to give no flow of current from generator 17.

2. *Electrical circuits*

Fig. 2 represents diagrammaticaly the electrical circuits of my preferred embodiment including that of the earth inductor compass. Armature 18 of the compass generator transmits current through brushes 20 and 21, as above described, whenever the craft is off of the course for which the brushes are set. The direction of flow of this current depends upon whether the deviation is to the left or right of the course set, and the amount of it depends on the amount of deviation. This current passes, as in existing embodiments of the earth inductor compass, through galvanometer coil 29 controlling indicator 30 by which the direction and approximate amount of the deviation from the desired course is visibly indicated. In my proposed embodiment this current also passes through relay coil 31 which controls contact arm 2, displacing it so as to close circuit 3 when the craft is to the left of the course for which the brushes are set and circuit 4 when to the right thereof; contact arm 2 being so positioned as to stand in the intermediate position with both circuits open when the craft is on the course for which the brushes are set, and consequently no curent flowing through coil 31. It will be observed that the remaining details of the electrical circuits are identical with those of the general arrangement shown in Fig. 1 and previously described.

3. Steering mechanism

In the particular embodiment illustrated in Figures 3 to 13 inclusive, an airplane installation is indicated. The position of rudder 6 is controlled by rudder-bar 33 through the medium of wires 34, 34 attached to projections 35, 35 rigid with rudder 6, as is customary in airplane construction. Pushing the left end of rudder-bar 33 forward will thus swing rudder 6 to the left on its hinged axis 11 thus acting to turn the plane to the left.

The electrical control of motor 7, by which automatic steering is accomplished, has previously been described. The mechanical arrangement involved in this particular embodiment will now be set forth. On the end of shaft 37 of motor 7 (see Fig. 5) is a worm 38 meshing with a worm gear 39 rigid with a threaded shaft 40, on which is seated a rider 41, the lower face of which is threaded to mesh with the threads of shaft 40. This rider is connected by means of bar 42 and hinged joint 43 to rod 44 which is rotatably supported beneath rudder-bar 33 by rigid brackets 45. Thus, one direction of rotation of motor 7 and shaft 40 will feed rider 41 forward, thus moving forward the left end of rudder-bar 33 and swinging the rudder toward the left, while the opposite rotation of the motor will swing the rudder toward the right.

For the safe operation of any automatic steering device on an airplane it is essential that direct steering by the pilot be readily possible whenever special maneuvering is required, and that automatic steering be automatically and positively operative whenever direct steering ceases. The conditions and speed under which an airplane must be operated, and the quickness with which it may be thrown out of control requires, easy, automatic, and fool-proof interchange between automatic and direct steering in order to render the use of an automatic steering device safe and practicable.

Figure 13:
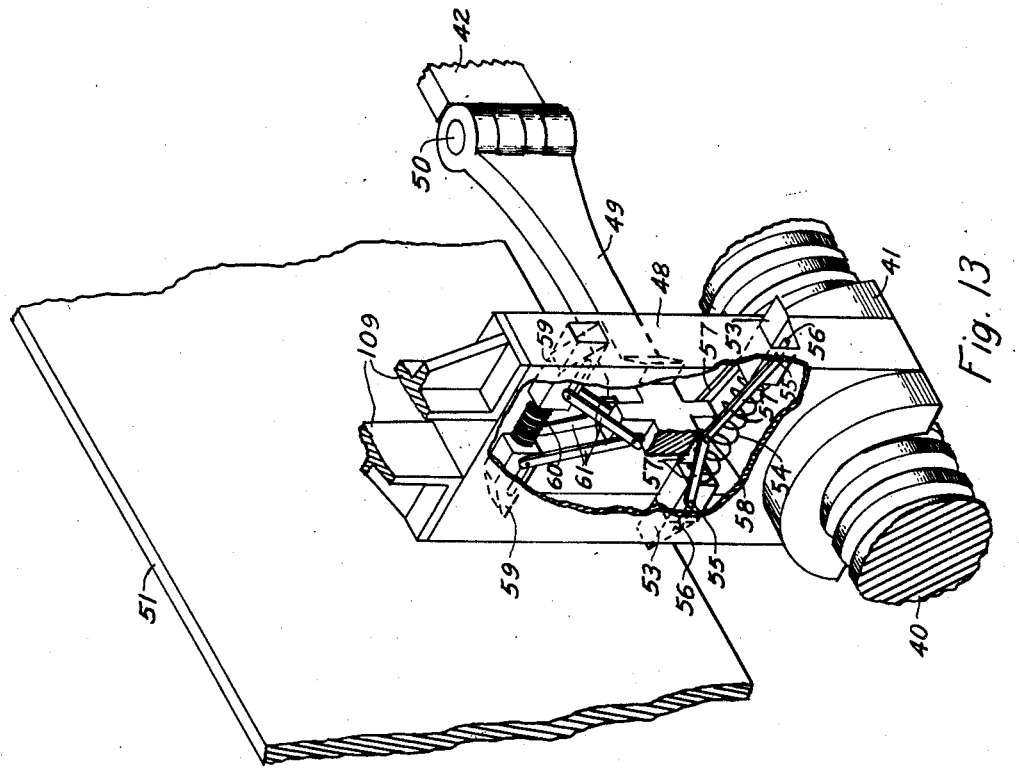
Fig. 13 is a perspective view of the latch mechanism for latching the automatic steering mechanism in either the engaged or disengaged position.

In order to provide for such interchange two foot-rests 46 are slidably mounted on rudder-bar 33. The lower faces of these foot-rests are formed as rack bars to mesh with sectors 47 rigid with rod 44 (see Figs. 5 and 12). Thus a pressure on foot-rests 46 will cause sectors 47 to rotate forward, and bar 42 to rotate upward raising rider 41, while the removal of such pressure would allow rider 41 to again fall into its place on shaft 40. To allow of retaining rider 41 positively engaged with shaft 40 during automatic steering, and positively disengaged while the pilot is steering, and to prevent the jarring of the plane from vibrating the rider between these positions, the latch system shown in detail in Fig. 13 is provided. This latch system operates as follows:—

Figure 12:
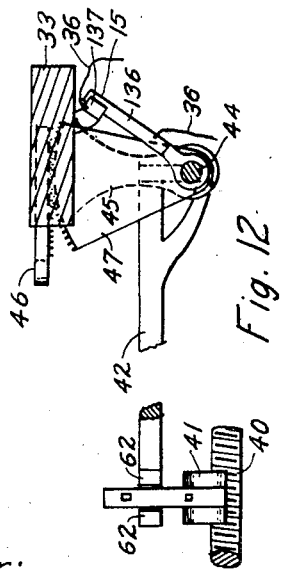
Fig. 12 is a vertical section of the rubber bar and mechanism connected therewith, taken on line 12—12, Fig. 5.

Extending upward from rider 41 is latch box 48, through which passes bar 49 which is hinged at 50 to bar 42. Latch box 48 is closely guided between two rigid plates 51 parallel with shaft 40. The latch box has a vertical slot 52 (Figs. 5 and 7) through which bar 49 passes, and which allows said bar a certain range of vertical motion with respect to the box. At such a height on the box as to just latch under plates 51 when rider 41 is engaged with shaft 40 is a pair of latches 53 which are normally forced apart by spring 54. Attached to these latches by small rods 55 extending through slots 56 in the latches are a group of bars 57, pivotally attached to bar 49 at 58 in such a manner that when bar 49 is raised by pressure on foot-rests 46 and moves upward through slot 52 latches 53 will be withdrawn from beneath plates 51 thereby leaving rider 41 free to be lifted by the remaining upward motion of bar 49. Near the top of the latch box 48 in a position to latch above plates 51 when rider 41 is raised, are a similar pair of latches 59, similarly separated by spring 60, and retracted by bars 61 when bar 49 is moved downward. In order to prevent longitudinal motion of bar 49 with respect to latch box 48 and rider 41, lugs 62 are provided on bar 49 extending each side of the latch box (Fig. 12).

4. Introduction of course corrections

(a) Method of introducing corrections

As previously described, it is essential in order to obtain smooth operation, to be able to introduce a "rudder-position correction" into the course set. With an earth inductor compass or other directional means dependent upon the earth's magnetic field it is also necessary to be able to conveniently correct for the magnetic variation, or the airplane would be, in most localities, travelling on a course far different from that set due to the variation of the earth's magnetic lines from true north. In aircraft, in particular, it is necessary to be able to accurately correct for the draft due to side winds and the like, and to head the ship into the wind by the proper amount to make the resultant motion along the desired course. Otherwise side winds would be likely to carry the aircraft far from the course it was intended to follow. It is also necessary that all of these corrections be introduced by means which will not mechanically interfere with the changing of course by means of the controller handle. It is also highly desirable that the "rudder-position correction device" continue to operate automatically and independently during the adjustment or resetting of any of the other correction devices and of the controller. All of these results are accomplished in my preferred embodiment, as follows:—

Each of these corrections is introduced by causing an angular rotation of the brushes in the earth inductor generator independently of the controller. For instance, correction for an increase of 2° in easterly magnetic variation can be introduced by rotating the brushes 2° to the right without changing the set of the controller. Similarly a drift of 10° to the right can be corrected by similarly turning the brushes 10° to the right thereby heading the ship 10° further to the left. Similarly the rudder-position correction may be introduced by rotating the brushes to the right or left, independently of the controller in a direction and amount corresponding to the movement of the rudder.

As previously described shaft 24 connects controller handle 5 with worm gear 23 on which the brushes are mounted. In existing embodiments of the earth inductor compass the various sections of shaft 24 are connected by universal joints or gearing such as to insure all parts of the shaft rotating simultaneously and equally. It is in effect one continuous shaft except for corners or angle points in the general line thereof. In my embodiment I introduce a device, by which the portion of shaft 24 to one side of the device may be rotated any desired amount with respect to the remainder of the shaft, thereby rotating the brushes any desired amount, while the portion of shaft 24 attached to the controller remains fixed.

To accomplish this the portion of shaft 24 attached to the controller terminates in a hollow sleeve 63 (Fig. 10) through which are cut two spiral slots 64 and 65, making in effect a double thread piercing the sleeve. Fitting snugly but freely within the sleeve is a shaft 66, in which are cut two grooves 67 and 68, spiralling the shaft in the direction opposite to that in which slots 64 and 65 spiral sleeve 63, and constituting a double thread on said shaft. Slidably mounted on sleeve 63 is ring 69, and projecting inwardly from two opposite points on said ring are two pins 70 and 71, each carrying two rollers 72 and 73. The arrangement is such that pin 70 extends through slot 64 and into groove 67, the rollers being substantially the same diameter as the slot and groove widths, roller 72 rolling along the edge of slot 64, and roller 73 along the edge of groove 67 if the ring is slid along sleeve 63. Pin 71 with its rollers extends in the same manner through slot 65 and into groove 68. The pitch of the spirals is great enough so that ring 69 may be slid along sleeve 63. With the arrangement of spirals shown in Fig. 10 sliding the ring back away from the observer would, with sleeve 63 remaining fixed, cause the ring to rotate to the right, or clockwise. The same sliding of the ring would cause shaft 66 to rotate in the came direction with respect to the ring, the resultant movement of shaft 66 with respect to sleeve 63 being the sum of these two movements. For instance, if the pitch distance along the shaft separating two successive turns of the same spiral, is the same on shaft 66 as on sleeve 63, and ring 69 is moved through this distance, the ring will make one complete revolution with respect to the sleeve and the shaft one revolution with respect to the ring, the shaft thus making two complete revolutions with respect to the sleeve. If each revolution of shaft 24 moves the brushes through 10°, moving the ring by the full pitch distance above mentioned would rotate the brushes through 20°. It will be observed that shaft 66 cannot turn in sleeve 63 without ring 69 sliding longitudinally, and that therefore holding ring 69 in a fixed longitudinal position effectually locks shaft 66 in sleeve 63, any rotation of shaft 24 then turning the sleeve, ring, and shaft in unison.

In order to accurately control the longitudinal position of ring 69 and to at the same time leave it free to rotate with shaft 24 I provide a hollow cylinder 74 into which the ring smoothly fits, the side of the ring resting against annular end 75 of the cylinder. A short sleeve 76 is arranged to screw into cylinder 74 and is provided with a set nut 77 to set up against cylinder 74 and hold it at the proper clearance to avoid binding ring 69. The unit thus assembled will be called "corrector-unit" 78. Thus the longitudinal position of ring 69 is fixed by that of corrector-unit 78 but the ring is free to turn with respect to said unit as its longitudinal motion or the rotation of shaft 24 may require.

Obviously a similar sleeve, shaft, and corrector-unit could be provided for introducing each correction, but I prefer to introduce both the correction for magnetic variation, and that for drift, through the corrector-unit 78 already described, and the correction for rudder-position by a similar unit 79 sliding on sleeve 80 rigid with the rear part of shaft 24. Shaft 66 is made long enough to extend into sleeve 80 also, so that the longitudinal position of corrector-unit 79 fixes the angular relation between shaft 66 and the rear part of shaft 24, just as the position of corrector-unit 78 fixes the angular relation between the forward part of shaft 24 and shaft 66.

With the particular arrangement of parts indicated sliding corrector-unit 78 forward (toward the front end of the plane) will rotate the brushes to the left thereby correcting the course to the right, while sliding corrector-unit 79 in the same direction will produce the opposite effect. In any case a certain definite position of each corrector-unit will set the brushes for zero correction and the amount of correction introduced by either corrector-unit will be proportional to its distance from this zero position.

(b) Drift correction

In my preferred embodiment the drift correction is introduced by the rotation about a substantially vertical axis 81 of a telescope or other sighting device 82 (Figs. 5 and 9). Throughout the operation of automatic steering the pilot keeps this device pointed, by as frequent checking as may prove necessary, at the objects on the ground directly toward which the craft is moving. For instance, if the side winds are such that the resultant motion of the craft is 30° to the left of its longitudinal axis sighting device 82 will be pointed 30° left of said axis. For convenience in operation and in putting the sighting device out of the way when not in use axis 81 of the sighting device is made telescopic, but the various sections keyed to each other so that they cannot rotate upon one another. Rigid with the bottom section of the axis is a horizontal bevel gear 83 meshing with a similar vertical gear 84, to which is rigidly attached a geared segment 85 meshing with a rack bar 88. Corrector unit 78 is attached to this rack bar in such a manner as to move in unison therewith. The angular displacement of bevel gears 83 and 84 and of segment 85 will be proportional to the angle of drift of the plane as measured by sighting device 82, and therefore the linear motion of rack bar 88 and corrector unit 78 will also be proportional to this same angle. The radius of segment 85 is constructed such that the linear motion of corrector unit 78 resulting from a given angular movement of sighting device 82 will be such as to produce an exactly equal angular displacement of the brushes. This will cause the effective set of the earth inductor compass to be corrected by an amount equal and opposite to the drift, thereby causing the craft to head in such a direction that its resultant motion with respect to the earth will be on the desired course.

In order to provide for conveniently and accurately eliminating the drift correction, if at any time it is desired to operate the craft without it, a rigid guide 86 (Fig. 5) is provided in such a position as to engage mounting 87 of sighting device 82 when that is lowered out of its position by telescoping axis 81, and to guide it into a straight forward position, thereby automatically setting the device for zero drift correction. The use of the drift correction apparatus even when the pilot is steering directly will undoubtedly prove desirable under many circumstances, however, as under present methods it is quite difficult to make proper allowance for any considerable drift, while with the use of sighting device 82 the earth inductor compass will function in respect to the resultant direction of motion of the craft, instead of the direction of its axis.

(c) Magnetic variation correction

To allow of introducing the magnetic variation correction, through the same corrector-unit as the drift correction, corrector-unit 78 is slidably attached to rack bar 88 instead of being rigidly attached to it (see Figs. 8 and 9). The corrector-unit may be slidably adjusted with relation to the rack bar by the loosening of clamp screw 89 and the rotation of adjustor 90, which effects the adjustment through the medium of pinion 91 rigid therewith and rack 92 rigid with corrector-unit 78 and meshing with the pinion. The amount of the magnetic variation correction introduced may be read directly by the position of index mark 93 on rack bar 88 with reference to graduations on face 94 rigid with the corrector-unit.

(d) Rudder-position correction

The general purpose and nature of the rudder-position correction has been described under section A—4 of these specifications. The introduction of this correction is provided for in my preferred embodiment as follows:—

Figure 7:
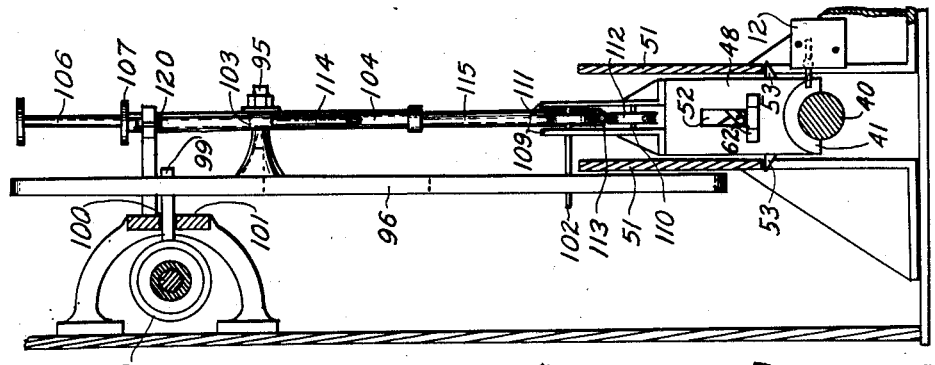
Fig. 7 is a vertical section along line 7—7 of Fig. 6.
Figure 6:
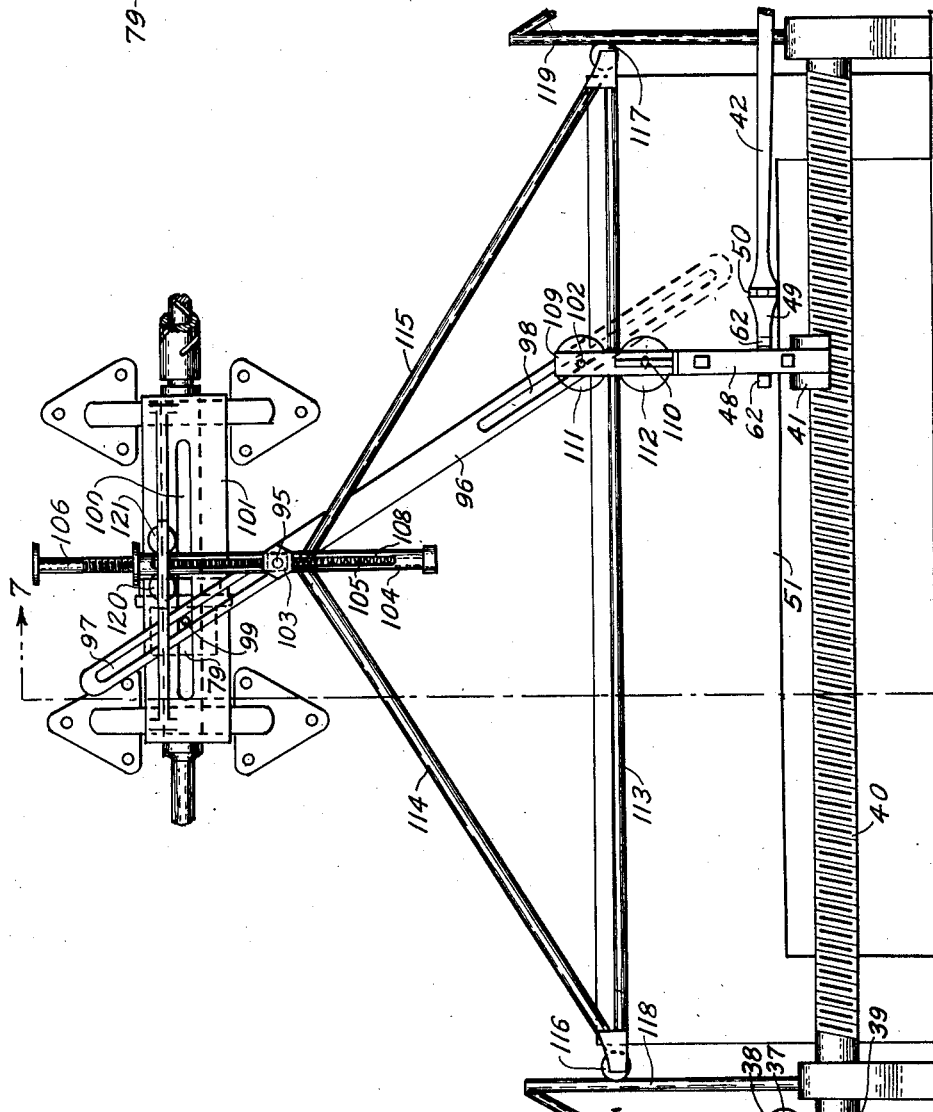
Fig. 6 is a right side elevation of certain of the mechanism shown in Fig. 5 including particularly that connected with the "rudder-position correction".

Mounted on horizontal axis 95 is a pivoted lever 96 through the upper part of which is a lateral slot 97 and through the lower part of which is a similar slot 98 (see Figs. 6 and 7). Pin 99, rigid with corrector unit 79 extends laterally through slot 100 in guide plate 101 and into slot 97 of lever 96 while pin 102 rigid with rider 41 extends into slot 98. Thus any movement of rudder 6 (which must be accompanied by a corresponding longitudinal movement of rider 41 as previously described), rotates lever 96 on its axis 95, and causes a proportionate movement of corrector-unit 79 in the opposite direction and a corresponding change in the position of generator brushes 20 and 21, the amount of movement of unit 79 and of the corresponding correction depending upon the proportionate distances of pins 102 and 99 from axis 95.

It is necessary to be able to change the proportionate amount of the rudder-position correction in order to adapt the apparatus to the particular craft and type of steering desired, each increase in the rudder-position correction tending toward smoother steering but more sluggish return of the craft to course when displaced. The amount of movement of corrector-unit 79 that will be required for a given movement of rider 41 will depend upon the smoothness and promptness of return to course desired, and upon the area of the rudder with respect to the size of the entire craft, the angular throw of the rudder produced by a given movement of rider 41 and various other factors affecting the turning effect produced by a given movement of the rider. The proper proportionate amount of the correction can best be determined by trial after the installation of the steering device on each particular craft. Arrangements are therefore provided for conveniently adjusting the ratio of the respective distances of pins 102 and 99 from axis 95 by raising or lowering said axis, as follows:—

Axis 95 is supported by mounting 103 which is slidably mounted in vertical cylinder 104, being held up by spring 105 against adjusting screw 106, which is arranged to screw downward into cylinder 104, and is held in position by set nut 107. Axis 95 extends laterally through mounting 103 and through vertical slots 108 in the lateral faces of cylinder 104. Thus by loosening set nut 107 and screwing adjusting screw 106 downward or upward the proportionate amount of the rudder-position correction is respectively increased or decreased.

If the rudder-position correction device were to continue to function during direct steering it would result in an erroneous indication on the earth inductor compass whenever the rudder was out of its straight position. I therefore, provide means by which the rudder-position correction is automatically eliminated whenever the rudder bar is being used, as follows:—

When the pilot presses against foot rests 46, rider 41 is raised in the manner described under section B—3 above. Rigid with the rider and extending upward from latch box 48 are two guide plates 109, connected by two axes 102 and 110 on which wheels 111 and 112 respectively are mounted. Fitting snugly between these wheels and extending horizontally parallel to shaft 40 is rod 113 rigidly attached to cylinder 104 by means of rods 114 and 115. As rider 41 moves back and forth in either its lowered or its raised position wheels 111 and 112 slide along rod 113 without moving it, but when rider 41 is raised or lowered rod 113 and cylinder 104 are correspondingly raised or lowered. The rigid framework 113, 114, 115, 104, is guided by two guide wheels 116 and 117 at the extremities of rod 113 running on vertical guides 118 and 119 respectively, and by wheels 120 and 121 mounted on axis rigid with the body of the craft and guiding cylinder 104, in such a manner that the framework is raised or lowered by rider 41 without rotation or binding regardless of the position of the rider. Slot 97 in bar 96 extends down to and into axis 95 in such a manner that the axis can be raised into the line of pin 99 but no farther. Any further raising of rider 41 and cylinder 104 causes further compression of spring 105, and rider 41 may be brought into its fully raised position at the expense of such compression. Since the longitudinal motion of rider 41 imparts no motion to axis 95, no movement of pin 99 and corrector-unit 79 can take place, while axis 95 is raised into the line of pin 99, as it is during the use of rudder-bar 33. The raising of rider 41 will bring axis 95 and pin 99 into coincidence, sliding corrector-unit 79 into its neutral position, thereby reducing the rudder-position correction to zero, regardless of the position of the rudder.

5. Cut-out and control switches

Although with the apparatus as above outlined, the airplane is not likely to be displaced from its course, after having once settled onto it, by an amount sufficient to cause a very great displacement of the rudder, any considerable change in the course set or in the drift correction would move the rudder beyond the limits of its safe range for automatic steering, and be likely to throw the airplane into a side-slip. Limiting of the range of the rudder during automatic steering is therefore essential to the safe operation of the device. Some limitation of range would of course, also be necessary to prevent the mechanical damage to the equipment itself which would result from continuing electrical contact in one direction after reaching the mechanical limit of the steering apparatus in that direction. This limitation of range is accomplished by cut-out switches 12 and 13 as explained in section A—3 above.

In my preferred embodiment I utilize rider 41 as the bumper 14 to operate the switches, and I provide switches so designed that rider 41 may be lowered in any position or move from outside the operating range into the range without damaging the switch which features are essential as the pilot may change from direct to automatic control with the rider in any of these positions.

Figure 11:
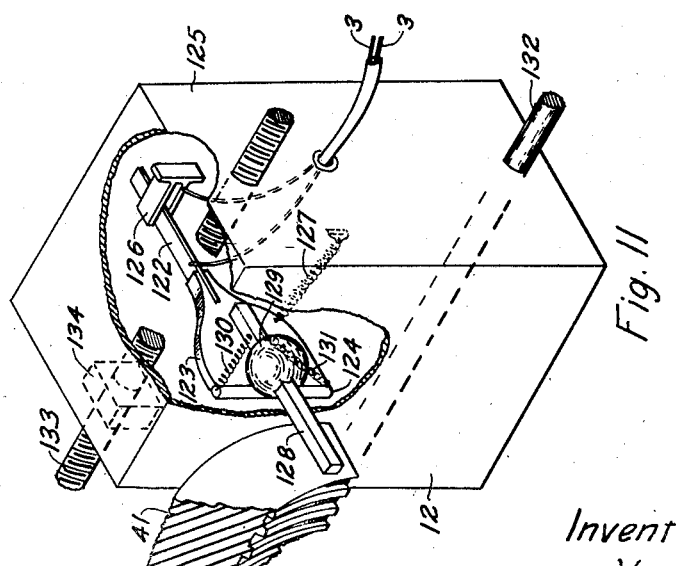
Fig. 11 is a perspective view of one of the cut-out switches for limiting the range of rudder movement during automatic steering.

The details of switch 12 are shown in Fig. 11. The switch consists of knife 122 rigid with non-conductive arm 123 which is attached by means of vertical hinge 124 to switch box 125. Knife 122 is normally held between blades 126 by the tension of springs 127. Circuit 3 leads into knife 122 and out of blades 126 so that it is broken when these are separated, and closed when they are in contact. The opening of the switch is accomplished by means of bar 128 which is pivotally mounted so as to swing in any direction by means of ball 129 in the face of switch-box 125. Bar 128 extends laterally through this ball mounting, outward into the line of movement of rider 41, and inward alongside of arm 123. It is normally held against arm 123 and in a horizontal position by springs 130 and 131, which are attached to the frame substantially in line with hinge 124 and therefore do not affect the position of knife 122. The entire arrangement is such that the protruding end of bar 128 may be forced down or forward without opening the switch and the bar will return to its normal position, when released, under the action of springs 130 and 131. If however, the protruding end is forced backward, as it would be whenever rider 41 reaches the rear end of its operating range the forward pressure of the inner end of bar 128 against arm 123 opens the switch and holds it open until rider 41 moves away and releases bar 128, whereupon the switch again closes under the action of spring 127.

To allow of adjustment of the operating range, which is essential in order to adapt the apparatus to the characteristics of the particular craft on which it may be installed, and the particular condition under which it may be operating, the boxes of switches 12 and 13 are each mounted on two parallel rods 132 and 133 (see Figs. 5 and 11), rod 132 being smooth, but rod 133 being threaded in opposite directions from the center. Rigid with each box is a nut 134 threaded to mesh with bar 133. At one end of bar 133 is a hand wheel 135 by the turning of which switches 12 and 13 will be moved simultaneously toward or away from the neutral position of rider 41 so as to decrease or increase the operating range. While it is essential as previously outlined that the rudder range be strictly limited during automatic steering such limitation of rudder motion must be automatically removed when direct steering commences and the pilot is prepared to bank the airplane for whatever turning effect may be produced. If the limitation were to continue during direct steering it would prevent the usual range of maneuvering of the plane, and were the automatic removal of the limitation by the commencement of direct steering not provided for it would be very likely to result disastrously in any emergency demanding immediate use of direct steering. I provide for such automatic removal in that when direct steering is commenced rider 41 is raised as described in section B—3 of these specifications into a position in which it does not engage cut-out switches 12 and 13.

The operation of control switch 15 (see section A—3 of these specifications) is made automatic in my preferred embodiment, as follows:—

The switch is located under the rudder-bar 33 (see Fig. 12) and consists of knife 136 rigid with shaft 44 in such a position that the end of it is between blades 137, thereby closing circuit 36, when rider 41 is down on shaft 40, but is moved away from said blades, thereby opening the circuit when pressure is exerted on foot-rests 46 and rider 41 raised. When the craft is idle the cessation of current from the earth inductor compass leaves contact arm 2 in the neutral position and circuits 3 and 4 open. If for any reason the contact arm should close one of these while the plane was motionless and the rudder-bar idle the cut-out switch 12 or 13 would serve as an automatic cut-out as described in Section A—3 above.

6. *General method of operation*

Probably the greatest use of the steering device described will be in cross country flights. Before ascending, the pilot can scale from a map the course to his destination or the various courses by which he wishes to reach his destination, and can set the course he wishes to follow on controller 5. He can set the magnetic variation correction for the average value of the variation for the territory to be traversed, or for a particular long flight, set it for the variation pertaining to the first part of the trip, later correcting the set during flight. He can then take off, steering the plane in the usual manner, and when he has reached a sufficient height to permit his taking the desired course, head the plane into the general direction of his course, take his feet off the rudder-bar, train sighting device 82 onto the objects toward which the plane is moving, and the plane will settle down onto the desired course without further attention from the pilot than occasional checking of the drift by sighting device 82. This steering device in conjunction with a device such as that covered by my co-pending application No. 132,686 filed August 31, 1926, for relieving the pilot of hand control, leaves the control of the plane entirely automatic and gives the pilot complete freedom during flight, so that he may act as his own navigator, even though fairly extensive consultation of maps and the like may be necessary. When he wishes to do any extensive maneuvering or to land, he merely has to put his feet on the rudder-bar and he has the same direct control of the steering as on planes without the automatic steering device.

If at any time during flight the pilot wishes the plane to be automatically steered toward any objective visible to him but of which he does not know the bearing, he may steer the ship by means of the rudder-bar until it is moving toward the objective, then turn controller handle 5 so as to bring indicator 30 to its zero position, take his feet off the rudder-bar and the plane will continue to be automatically steered toward its objective. The pilot may either head the plane with its nose directly toward the objective when setting the indicator, and then set sighting device 82 to take care of the drift after automatic steering has commenced; or he may, preferably, set the sighting device first and head the plane so that its resultant direction is toward the objective and then start automatic steering.

If the plane is being automatically steered on any course and it is desired to change the heading toward some visible objective it is not necessary to change to direct steering in order to change the course, particularly if the change of course is small. Instead, controller 5 can be turned to indicate a change of course in the desired direction and adjusted by trial until the indicator comes to zero or averages zero while the resultant course as sighted through sighting device 82 is toward the desired objective.

The use of the steering device is by no means limited to long cross-country flights but it will prove of great value wherever accurate control of the course to be followed is desired, as in map photography and various other special aerial work. For such purposes the pilot may utilize any desired combination of direct steering automatic steering on pre-determined course, or automatic steering toward visible objective that may best suit the purposes in hand, and the ease and safety with which the pilot may change from one of these methods of steering to the other when utilizing my device makes it especially well adapted to a wide variety of such uses.

What I claim is:

1. In automatic steering mechanism, the combination of a directional element, and adjustable member capable of unlimited angular displacement and adapted to determine the course to be steered by virtue of its relative relation to the directional element, an indicator adapted to register said course, and means adapted to displace the adjustable member with respect to the indicator so as to introduce course corrections without changing the course indication.

2. In automatic steering mechanism, the combination of a directional element and an adjustable element in conjunction therewith adapted to establish a critical course by virture of its relation to the directional element, a rudder, mechanism connecting the rudder to the adjustable element so as to constrain the two to move in unison, and means adapted to adjust said mechanism so as to alter the corresponding relative amounts of movement of the rudder and the adjustable element.

3. In automatic steering mechanism, the combination of a rudder, a directional element, an adjustable element adapted to establish a critical course by virtue of its relative relation to the directional element, a member constrained to move in unison with the rudder and adapted to actuate said adjustable element so as to change the critical course by an amount proportional to the movement of the rudder, means for adjusting said constrained member so as to alter, at will, the ratio of the rudder movement to the corresponding amount of change in the critical course, and mechanism adapted to restrain said means so as to retain said ratio at any desired value.

4. In automatic steering mechanism, the combination of an adjustable element adapted to be positioned so as to establish a critical course, a rudder, a pivotally mounted lever constraining the element to move in proportion to the rudder movement, and an adjusting screw adapted to so move the axis of the pivotally mounted lever as to alter the ratio of the rudder movement to the corresponding movement of the element.

5. In automatic steering mechanism, the combination of an element adapted to be positioned so as to establish a critical course, a rudder, a member constraining the element to move in proportion to rudder movement, an adjusting screw adapted to so displace the member as to alter the ratio of the rudder movement to the corresponding movement of the element, and a set nut adapted to restrain the adjusting screw and retain said ratio at a fixed value.

6. In steering mechanism, the combination of a directional element, a member adapted to be rotatably positioned with respect thereto, a rudder, and means constraining the rotatably positioned member to move in unison with the rudder, said means including two concentric cylinders having helical slots, a ring concentric with the cylinders and having projections extending into the slots, and a member with respect to which the ring is freely rotatable for controlling the longitudinal positions thereof.

7. In a dirigible vehicle, automatic steering mechanism, including the combination of an electrical armature revolving in the earth's magnetic field, wires leading from the armature and connected to it in such a manner that a current will flow in one direction through the wires when the vehicle is headed to one side of a critical course and in the other direction when it is headed to the other side of said course, a member capable of unlimited rotational displacement with respect to the vehicle for altering said critical course, a rudder, and means constraining said last mentioned member to move in unison with the rudder.

8. In a dirigible vehicle, automatic steering means, including the combination of a directional element, a member relatively adjustable through an unlimited range with respect thereto to define a critical course, an indicator constrained to move in unison with said adjustable member to register said course, and a member adapted to be positioned to correspond to the angle between the axis of the vehicle and its line of motion and to displace said adjustable member with respect to the indicator to correct for lateral movement of the vehicle.

9. In an aircraft, means for automatically steering same on a selected course including an element adjustable with respect to the craft to establish the course to be followed, a member adapted to be placed in the line of resultant motion of the craft and means actuated thereby to displace the above mentioned element so as to alter the course by an angle equal to the angle between the longitudinal axis of the craft and its resultant motion.

10. In an aircraft, means for automatically steering same on a desired course including a sighting device adapted to determine the resultant line of motion of the craft when in flight, an element adjustable with respect to the craft to establish the course to be followed, an indicator adapted to register the course established, and means actuated by the sighting device for automatically displacing the adjustable element with respect to the indicator by an angle corresponding to the angle between the longitudinal axes of the sighting device and of the craft.

11. In a dirigible vehicle, means to automatically steer same on a desired course including an element adapted to establish a critical course by virtue of its angular relation to the vehicle, an indicator adapted to register the course so established, and a member adapted to displace the element with respect to the indicator by an angle corresponding to the magnetic variation.

12. In a dirigible vehicle, means adapted to automatically steer the vehicle including a steering element, members adapted to be positioned to correspond respectively to the magnetic variation, the angle of drift, and the displacement of the steering element, and means actuated by said members to automatically change the heading of the vehicle by corresponding angles, said last named means including a plurality of cylinders with helical guides and interlocking, longitudinally slidable members.

13. In steering mechanism a steering element, two switches adapted to limit the range thereof equally right and left of the neutral position, and means for simultaneously adjusting during operation the limits of said range and for keeping the two limits equally spaced from the neutral position, including a member threaded in opposite directions on the two sides of the center of the desired range, said member being adapted upon rotation to move the switches equally in opposite directions.

14. In a dirigible vehicle, automatic steering mechanism including a rudder, a pedal member connected thereto and constrained to move in unison therewith, a threaded shaft reversibly driven according to the rudder movement required, and a member meshing therewith and connected to the rudder through the pedal member.

15. In a dirigible vehicle, the combination of a steering element, direct steering means for the operator to directly control the operation thereof, automatic steering means for automatically controlling the operation thereof including a threaded shaft and a member meshing with a portion of the circumference thereof, and means for automatically separating said member from said shaft upon actuation of the direct steering means.

16. In a dirigible vehicle the combination of a steering element, direct-steering mechanism operative by the operator's feet for controlling the position thereof, and automatic steering mechanism including a power driven member and a member actuated thereby and so connected to the steering element as to control the position thereof, and means for maintaining said two members in operative juxtaposition except when the operator's feet are upon the direct-steering means, and means automatically operative when the direct-steering means are pressed upon, to so separate the two members as to prevent the actuation of one by the other.

17. In an airplane, the combination of a rudder, pedal members adapted to control the operation thereof, automatic-steering means including a power-driven threaded shaft and a movable member designed to mesh with a portion of the circumference thereof and to control the position of the rudder and means operative upon actuation of the pedal members to automatically render the automatic-steering means inoperative by separating the power-driven shaft and the movable member.

18. In an airplane, the combination of a rudder, pedal members adapted to control the operation thereof, automatic steering means including a power-driven threaded shaft and a movable member designed to mesh with a portion of the circumference thereof and to control the position of the rudder and means operative upon actuation of the pedal members to automatically render the automatic-steering means inoperative by separating the power-driven shaft and the movable member, said last named means including geared segments actuated by the pedal members and in turn actuating a lever controlling the position of the above mentioned movable member.

19. In a dirigible vehicle the combination of a steering element, direct-steering means for the operator to directly control the operation thereof, and automatic-steering means for automatically controlling the operation thereof including a threaded shaft, a member meshing with a portion of the circumference thereof, and means for automatically removing said member from said shaft during the operation of the direct-steering means and for automatically bringing said member and shaft into operative juxtaposition upon the cessation of direct steering.

20. In a dirigible vehicle the combination of a steering element, direct-steering mechanism, and automatic-steering mechanism including a member reversibly driven according to the required movement of the steering element, another member designed to mesh therewith, means for retaining said members enmeshed except during actuation of the direct-steering mechanism, and means automatically operative upon actuation of the direct-steering mechanism to separate said members and to lock them apart during such actuation.

21. In a dirigible vehicle the combination of a steering element, direct-steering mechanism, and automatic-steering mechanism including a threaded shaft reversibly driven according to the required movement of the steering element, a member designed to mesh therewith, means for retaining said member enmeshed with said shaft except during actuation of the direct-steering mechanism including plates parallel to the shaft and latches fastening under said plates except when released by actuation of the direct-steering mechanism, and means automatically operative upon actuation of the direct-steering mechanism to separate the said member from the shaft and to lock it clear of the shaft during such actuation by means of latches engaging the sides of said plates opposite to those engaged by the first mentioned latches.

22. In a dirigible vehicle, direct-steering mechanism, automatic-steering mechanism and means for automatically rendering the automatic-steering mechanism inoperative during actuation of the direct-steering mechanism by separating two of the operating members thereof, locked together during operation, said means including a member moved by the actuation of the direct-steering mechanism and mechanism actuated by said movement to release and restrain the lock holding said operating members together, to move the members apart, and to actuate mechanism to lock them apart.

23. In a dirigible vehicle, direct-steering mechanism, automatic-steering mechanism, and means for automatically rendering the automatic-steering mechanism operative upon cessation of direct steering by bringing and locking together two of the operating members of the automatic-steering mechanism which are locked apart during direct steering, said means including a member moved by the cessation of pressure on the direct-steering mechanism, and mechanism actuated by said movement to release the lock holding the operating members apart, to move the members together and to actuate mechanism to lock them together.

24. In a dirigible vehicle, pedal members for steering same, a lever automatically moved into one position during the actuation of the pedal members, and automatically moved into another upon the cessation of such actuation, automatic-steering means operative when a member actuated by said lever is in said latter position and inoperative when it is in the first mentioned position, mechanism adapted to lock said member in its respective positions and to release it from either position only upon movement of the lever toward the other position.

25. In a dirigible vehicle, pedal members for steering same, a lever automatically moved into one position during the actuation of the pedal members, and automatically moved into another upon the cessation of such actuation, automatic-steering means operative when a member actuated by said lever is in said latter position and inoperative when it is in the first mentioned position, mechanism adapted to lock said member in its respective positions and to release it from either position only upon movement of the lever toward the other position, said mechanism including two sets of latches movable in rigidly connected guides, connection between the latch-guides and the above mentioned lever permitting of the lever being moved over a limited range with reference to said guides, links connecting the lever to the latches in such a manner that a relative movement of the lever in either direction with respect to the guides will render inoperative the latches for locking the member in the position away from which the lever is moving and render operative the latches for locking the member in its opposite position.

26. In a dirigible vehicle, the combination of means actuated directly by the operator for steering same, means for automatically steering same including a steering element and mechanism for limiting the range thereof, and means automatically operative upon actuation of the first named means by the operator to render inoperative the mechanism limiting the range of the steering element.

27. In a dirigible vehicle a steering element, direct-steering means, automatic-steering means, means for limiting the range of the steering element including two switches and an actuator designed to move in line with the controls thereof, and means automatically operative upon actuation of the direct steering means for rendering said limitation of range inoperative, said means including mechanism actuated when the direct steering means is brought into operation to remove the actuator from the line of the switch controls.

28. In a dirigible vehicle, the combination of means actuated directly by the operator for steering same, means for automatically steering same including a steering element and mechanism in conjunction therewith, adapted to return the vehicle to its course when deflected therefrom and to so position the steering element as to gradually reduce the returning force as the vehicle approaches the course, and means automatically operative upon actuation of the first named means by the operator to render inoperative the above mentioned means for positioning the steering element so as to reduce the returning force.

29. In a dirigible vehicle the combination of direct steering means, automatic steering means including means for setting the course to be followed, a steering element and mechanism actuated thereby for altering the course from that set, and means operative upon actuation of the direct steering means for returning the course to that set, and for rendering inoperative the mechanism for altering the course.

30. In a dirigible vehicle the combination of direct steering means, automatic steering means including means for setting the course to be followed, a steering element and mechanism actuated thereby including a corrector, a pivotally mounted lever, and a member connecting the lever to the corrector for altering the course from that set, and means operative upon actuation of the direct steering means for rendering inoperative the mechanism for altering the course by bringing the axis of the member connecting the lever to the corrector into coincidence with the axis on which the lever is pivoted.

31. In a dirigible vehicle the combination of direct steering means, automatic steering means including a rudder, a course-corrector constrained to move in a straight line, and actuated by the rudder through a pivotally supported lever the pivotal axis of which is constrained to move in a direction perpendicular to that of the course corrector, and through a connecting member, and means operative upon actuation of the direct steering means for bringing the axis of the connecting member and the pivotal axis of the above mentioned lever both into the line of the common perpendicular to the lines of motion of the corrector and the pivotal axis.

32. In an airplane, pedal members adapted to steer the plane upon actuation by the operator's feet, automatic steering means including a rudder and a course-corrector actuated thereby through mechanism including a pivotally supported lever, means actuated by the placing of the operator's feet on the pedal members to move the pivotal axis of the lever into a line intersecting the line of motion of the course-corrector, and means (including a constrained member and a spring) adapted to stop it and retain it in said line during the actuation of the pedal members.

33. In a dirigible vehicle the combination of direct steering means, automatic steering means including means for setting a course, a steering element, and mechanism actuated thereby for altering the course from that set, means automatically operative upon actuation of the direct steering means for eliminating the alteration thus introduced into the course, and means automatically operative upon cessation of direct steering for again rendering operative said mechanism for altering the course.

34. In a dirigible vehicle, direct steering means the combination of a steering element, including a pedal member and a foot rest attached thereto and adapted to be displaced with reference thereto by the pressure of the foot in steering, and automatic steering means including a control switch one portion of which is rigid with the pedal member and the other portion of which is adapted to be displaced with respect thereto by the relative motion of the foot rest, and a member adapted to be actuated by the relative movement of the foot rest to mechanically disconnect the automatic steering means from the steering element.

35. In a dirigible vehicle the combination of direct steering means including a control surface, a member movable by the operator for steering the vehicle, and mechanism connecting the member to the control surface; automatic steering means including an electrically energized actuator and mechanism connecting the actuator to the control surface; and means automatically operative whenever pressure is exerted upon the direct steering means to render inoperative the electrically energized actuator and to simultaneously disconnect mechanically the control surface from the actuator and from the intermediate mechanism connecting the actuator to the control surface.

36. In a dirigible vehicle the combination of direct steering means including a control surface, a member movable by the operator for steering the vehicle, and mechanism connecting the member to the control surface; automatic steering means including an electrically energized actuator and mechanism connecting the actuator to the control surface; means automatically operative whenever pressure is exerted upon the direct steering means to render inoperative the electrically energized actuator and to simultaneously disconnect mechanically the control surface from the actuator and from the intermediate mechanism connecting the actuator to the control surface; and means automatically operative upon cessation of direct steering to restore electrical control of the electrically energized actuator and to simultaneously restore its mechanical connection with the control surface.

37. In a dirigible craft the combination of direct steering means, automatic steering means, and means automatically actuated by pressure on the direct steering means for disconnecting both mechanically and electrically the automatic steering means.

38. In a dirigible craft the combination of direct steering means, automatic steering means, and means automatically operative upon cessation of pressure on the direct steering means for both electrically operating the automatic steering means and for mechanically connecting it to the steering control.

39. In a vehicle the combination of direct steering means, automatic steering means including a power driven member and a member actuated thereby, and means automatically operative whenever the direct steering means are actuated for so separating the power driven member and the member actuated by it as to disable the automatic steering means.

40. In a device of the class described the combination of two concentric cylindrical members with spiral slots differing in direction, a member freely rotatable with the cylindrical members and having a pin interlocking slots on the respective cylindrical members, a casing within which said member is freely rotatable but not longitudinally slidable, so that each longitudinal position of the casing will effect and maintain a definite angular relation between the cylindrical members.

41. In a dirigible vehicle, automatic steering means including a steering element, members adapted to be positioned to correspond respectively to the magnetic variation, the angle of drift, and the displacement of the steering element, and means actuated by said members to automatically change the heading of the vehicle by corresponding angles.

Signed at San Luis Obispo, California, this 17th day of June, 1927.

HAROLD T. AVERY.